(12) United States Patent
Clarke et al.

(10) Patent No.: US 11,021,271 B2
(45) Date of Patent: Jun. 1, 2021

(54) RUGGEDIZED REACTION WHEEL FOR USE ON KINETICALLY LAUNCHED SATELLITES

(71) Applicant: SpinLaunch Inc., Long Beach, CA (US)

(72) Inventors: Maxim Clarke, Long Beach, CA (US); Carl Lawhon, Long Beach, CA (US); Jonathan Yaney, Long Beach, CA (US)

(73) Assignee: SpinLaunch Inc., Long Beach, CA (US)

( * ) Notice: Subject to any disclaimer, the term of this patent is extended or adjusted under 35 U.S.C. 154(b) by 299 days.

(21) Appl. No.: 15/976,222

(22) Filed: May 10, 2018

(65) Prior Publication Data

US 2019/0344909 A1    Nov. 14, 2019

(51) Int. Cl.
*B64G 1/28* (2006.01)

(52) U.S. Cl.
CPC ................... *B64G 1/283* (2013.01)

(58) Field of Classification Search
CPC ........................................ B64G 1/283
See application file for complete search history.

(56) References Cited

U.S. PATENT DOCUMENTS

| | | | |
|---|---|---|---|
| 4,184,572 A * | 1/1980 | Poubeau | B23Q 1/527 188/250 B |
| 4,394,529 A | 7/1983 | Gounder | |
| 4,465,951 A * | 8/1984 | Dalby | H02K 7/088 310/114 |
| 4,872,357 A | 10/1989 | Valliant De Guelis et al. | |
| 5,474,263 A | 12/1995 | Ford et al. | |
| 5,620,529 A | 4/1997 | Bassily et al. | |
| 5,666,127 A | 9/1997 | Kochiyama et al. | |
| 5,785,280 A | 7/1998 | Bandasarian | |

(Continued)

FOREIGN PATENT DOCUMENTS

| | | |
|---|---|---|
| WO | WO2019168549 A1 | 9/2019 |
| WO | WO2019216924 A1 | 11/2019 |

OTHER PUBLICATIONS

"International Search Report" and "Written Opinion of the International Searching Authority," Patent Cooperation Treaty Application No. PCT/US2018/033892, dated Jul. 27, 2018, 10 pages.

(Continued)

*Primary Examiner* — Jessica B Wong
(74) *Attorney, Agent, or Firm* — Carr & Ferrell LLP

(57) ABSTRACT

Provided is a reaction wheel assembly ruggedized for use in kinetically launched satellites. An example reaction wheel assembly may include a shaft mounted to a body of a satellite, a wheel mounted to the shaft, wherein a center of a gravity of the wheel is co-aligned with the shaft, and a support device mounted to the body of the satellite. The reaction wheel assembly may include bearings for holding the shaft to the body of the satellite and allowing a rotation of the wheel. The support device can be engaged to support the wheel to reduce a load on the shaft and the bearing, the load being caused by an acceleration of the satellite during a kinetic launch of the satellite. After the satellite is launched into space, the support device can be disengaged from supporting the wheel to allow the wheel to spin.

19 Claims, 15 Drawing Sheets

(56) References Cited

U.S. PATENT DOCUMENTS

| | | | |
|---|---|---|---|
| 6,498,728 | B1 | 12/2002 | Sarno et al. |
| 7,523,892 | B2 | 4/2009 | Cook |
| 8,468,902 | B2 | 6/2013 | Baudasse |
| 9,475,594 | B2 | 10/2016 | Barber et al. |
| 2002/0012237 | A1 | 1/2002 | Dimarco |
| 2002/0040950 | A1* | 4/2002 | Staley .................. F16D 3/56 244/165 |
| 2003/0183035 | A1 | 10/2003 | Blonski et al. |
| 2009/0173334 | A1 | 7/2009 | Krs et al. |
| 2010/0008053 | A1 | 1/2010 | Osternack et al. |
| 2010/0188831 | A1 | 7/2010 | Ortet |
| 2010/0319948 | A1 | 12/2010 | Vander Ploeg et al. |
| 2010/0320330 | A1* | 12/2010 | McMickell ............ B64G 1/286 244/165 |
| 2010/0321891 | A1 | 12/2010 | Steenwyk et al. |
| 2012/0090660 | A1 | 4/2012 | Keller et al. |
| 2012/0160324 | A1 | 6/2012 | Molnar et al. |
| 2016/0288931 | A1 | 10/2016 | Field et al. |
| 2019/0270528 | A1 | 9/2019 | Lawhon et al. |

OTHER PUBLICATIONS

3U CubeSat Structure; C3S, [online], [retrieved on Mar. 4, 2020], Retrieved from the Internet: <URL:https://www.c3s.hu/portfolio-item/3u-cubesat-structure/>, 5 pages.

Burd, Jeff, "High-G Ruggedization Methods for Gun Projectile Electronics", Proceedings of the 12th International Technical Meeting of the Satellite Division of The Institute of Navigation (ION GPS 1999); Sep. 14-17, 1999, Nashville, TN, pp. 1133-1141.

Granitzki et al., "High-G Survivability of an Upotted Onboard Recorder", Technical Report; ARDEC, METC, RDAR-MEF-I Picatinny Arsenal United States; Oct. 1, 2017, [online], [retrieved on Mar. 4, 2020], Retrieved from the Internet: <URL:https://apps.dtic.mil/dtic/tr/fulltext/u2/1041155.pdf>, 23 pages.

Flyash et al., "High-G Telemetry System for Tank Munitions", 23rd International Symposium on Ballistics; Tarragona, Spain, Apr. 16-20, 2007, 8 pages.

"International Search Report" and "Written Opinion of the International Searching Authority," Patent Cooperation Treaty Application No. PCT/US2020/017768, dated Apr. 28, 2020, 8 pages.

De Luca, A., "Architectural Design Criteria for Spacecraft Solar Arrays," Vega Space GmbH, Solar Cells—Thin-Film Technologies, ISBN: 978-953-307-570-9, 10.5772/21312 (2011), pp. 161-186.

"International Search Report" and "Written Opinion of the International Searching Authority," Patent Cooperation Treaty Application No. PCT/US2018/021619, dated May 25, 2018, 9 pages.

McFadden, Christopher, "Spinlaunch: Who Needs Rockets When You Can Use Space Catapults?," Interesting Engineering, Feb. 24, 2018 [retrieved on May 1, 2018], Retrieved from the Internet: <URL:https://interestingengineering.com/spinlaunch-who-needs-rockets-when-you-can-use-space-catapults>, 19 pages.

Gilreath, Harold E. et al., "Gun-Launched Satellites," in: Johns Hokins APL Technical Digest, vol. 20, No. 3 (1999), pp. 305-319.

"The XMN-Newton Spacecraft," Cosmos, Spacecraft, Technical Details [online], [retrieved on May 31, 2018], Retrieved from the Internet: <URL:https://www.cosmos.esa.int/web/xmm-newton/technical-details-spacecraft>, 3 pages.

"Techno Sat," Space Flight 101, Space News and Beyond [online], May 31, 2018 [retrieved on May 31, 2018], Retrieved from the Internet: <URL:http://spaceflight101.com/soyuz-kanopus-v-ik/technosat/>, 6 pages.

"Spacecraft Solar Cell Arrays", Nasa SP-8074, May 1971, pp. 1-49.

* cited by examiner

RUGGEDIZED REACTION WHEEL FOR USE ON KINETICALLY LAUNCHED SATELLITES

TECHNICAL FIELD

This disclosure relates to a field of kinetically launched satellites. More specifically, this disclosure relates to reaction wheel assemblies ruggedized for use in the kinetically launched satellites.

BACKGROUND

Reaction wheels are widely used as attitude control actuators on satellites. Generally, a reaction wheel comprises a mass, for example a wheel, with a shaft running through the center of the gravity of the mass. The shaft can be held by bearings, typically deep groove ball bearings, allowing the wheel to rotate about the shaft. The reaction wheel includes an electric motor, typically a direct-current (DC) brushless motor, and an electronic controller that drives the motor controlling the wheel's rotational rate and direction. The wheel and motor are sometimes combined such that the rotor of the electric motor and reaction wheel are part of a single assembly. Satellites may have between one to six (typically four) reaction wheels arranged in different orientations. By accelerating the wheel in one direction, a torque is imposed on the body of the satellite in the opposite direction. This allows controlling orientation of the satellite in a microgravity environment of space.

During a kinetic launch of a satellite, the satellite can undergo static or quasi-static acceleration loading in excess of 5,000 times the standard acceleration due to Earth's gravity. Therefore, the satellites and parts of satellites, including the reaction wheels, need to be designed to withstand such extreme loading.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to reaction wheel assemblies ruggedized for use in the kinetically launched satellites. Some embodiments of the present disclosure may allow protecting a shaft of a reaction wheel from a load that may be caused by acceleration during a kinetic launch of the satellite.

According to one example embodiment of the present disclosure, a reaction wheel assembly is provided. The reaction wheel assembly may include a shaft mounted to a body of a satellite. The reaction wheel assembly may further include a wheel mounted to the shaft. A center of a gravity of the wheel co-aligns with the shaft. The reaction wheel assembly may further include a support device mounted to the body of the satellite. The support device can be engaged to support the wheel to reduce a load on the shaft. The load can be caused by an acceleration of the satellite during a kinetic launch of the satellite.

The support device can be disposed between the wheel and the body of the satellite during the kinetic launch of the satellite. The support device may prevent the wheel from spinning during the kinetic launch of the satellite. After the launch, the support device can be disengaged from supporting the wheel after the acceleration becomes lower than a predetermined value to allow the wheel to spin. The support device can be released by moving the shaft and the wheel while keeping the support device in the same position with respect to the satellite. The support device can also be released by moving the support device while keeping positions of the shaft and the wheel with respect to the body of the satellite the same.

The acceleration of the satellite during a kinetic launch of the satellite may exceed a standard acceleration by at least 5,000 times. The direction of the acceleration can be constant with respect to the shaft.

The reaction wheel assembly may further include bearings for holding the shaft to the body of the satellite and for allowing a rotation of the wheel. The support device can be configured to support the wheel to reduce the load on the bearings.

The reaction wheel assembly may further include an electric motor configured to cause a rotation of the wheel around the shaft. The electric motor may include one or more permanent magnets. The one or more permanent magnets can include annular-shaped permanent magnets. The electric motor may further include one or more positioning magnets. The one or more permanent magnets and the one or more positioning magnets can be integrated into the wheel. The electric motor may further include one or more magnetic coils rigidly affixed to the body of the satellite. The electric motor may further include one or more hall effect sensors rigidly affixed to the body of the satellite. The one or more hall effect sensors can be configured to determine, based on magnetic field of the one or more positioning magnets, data including a speed of the wheel and a rotational position of the wheel. The electric motor may further include an electronic controller. The electronic controller can be operable to read the data from the one or more hall effect sensors and determine, based on the data, a direction of an electric current to apply to the one or more magnetic coils.

The support device may include one or more support blocks. The support blocks can be configured to be moved into positions between the wheel and the body of the satellite to support the wheel during the kinetic launch of the satellite. The support device may further include one or more springs. A first end of the one or more of the springs can be attached to the body of the satellite and a second end of the one or more of the springs can be attached to one or more support blocks. The springs can be compressed when the support blocks are moved between the wheel of the satellite and the body of the satellite.

The support device may include one or more release devices attached to the body of the satellite. The one or more release devices can be configured to secure the support blocks between the wheel of the satellite and the body of the satellite during the kinetic launch of the satellite. If there is more than one support block, the support blocks can be positioned symmetrically with respect to the center of gravity of the wheel.

The one or more release devices can be configured to release the one or more support blocks, thereby causing the one or more springs to move the one or more support blocks from positions between the wheel and the body of the satellite. The one or more release devices can include non-explosive release devices. The non-explosive release devices can include a shape memory alloy.

According to one example embodiment of the present disclosure, a method for ruggedizing a reaction wheel assembly is provided. The method may include attaching, by one or more springs, one or more support blocks to a body of a satellite. The support blocks can be configured to be positioned between a wheel and the body of the satellite during a kinetic launch of the satellite. The wheel can be mounted to a shaft. The shaft can be mounted to the body of the satellite by bearings. The center of gravity of the wheel can be co-aligned with the shaft.

The method may further include, prior to the kinetic launch of the satellite, compressing the one or more springs to move the one or more support blocks into positions between the wheel and the body of the satellite. The one or more support blocks can be configured to support the wheel to reduce a load on the shaft and prevent the wheel from spinning. The load can be caused by an acceleration during the kinetic launch. The acceleration may exceed a standard acceleration due to gravity by at least 5,000 times. The direction of the acceleration can be constant with respect to the shaft.

The method may further include securing, by one or more release devices, the one or more support blocks in the positions between the wheel and the body of the satellite. The one or more release devices may include a non-explosive release device including a shape memory alloy.

The method may further include releasing after the kinetic launch of the satellite, by one or more release devices, the one or more support blocks to allow the one or more support blocks to move from the positions between the wheel and the body of the satellite. The support blocks can be removed due to extension of the springs.

According to one example embodiment of the present disclosure, a reaction wheel assembly is provided. The reaction wheel assembly may include an assembly body. The assembly body can be mounted, by one or more sprung hinges, to the body of satellite. The reaction wheel assembly can further include a shaft mounted to the assembly body by bearings. The reaction wheel assembly can further include a wheel mounted to the shaft.

The center of the gravity of the wheel can be co-aligned with the shaft. The assembly may include one or more release devices attached to the body of the satellite. The one or more release devices can be configured to secure the assembly body along the body of the satellite during a kinetic launch of the satellite. The one or more release devices can be further configured to release the assembly body to allow the assembly body to rotate about the sprung hinges by a predetermined angle after the kinetic launch of the satellite. The reaction wheel assembly may include one or more support blocks attached to the body of the satellite. The one or more support blocks can be configured to support the wheel when the assembly body is secured along the body of the satellite to reduce a load on the shaft. The load can be caused by an acceleration of the satellite during the kinetic launch of the satellite. The direction of the acceleration can be constant with respect to the shaft.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXEMPLARY EMBODIMENTS

Figure 1:
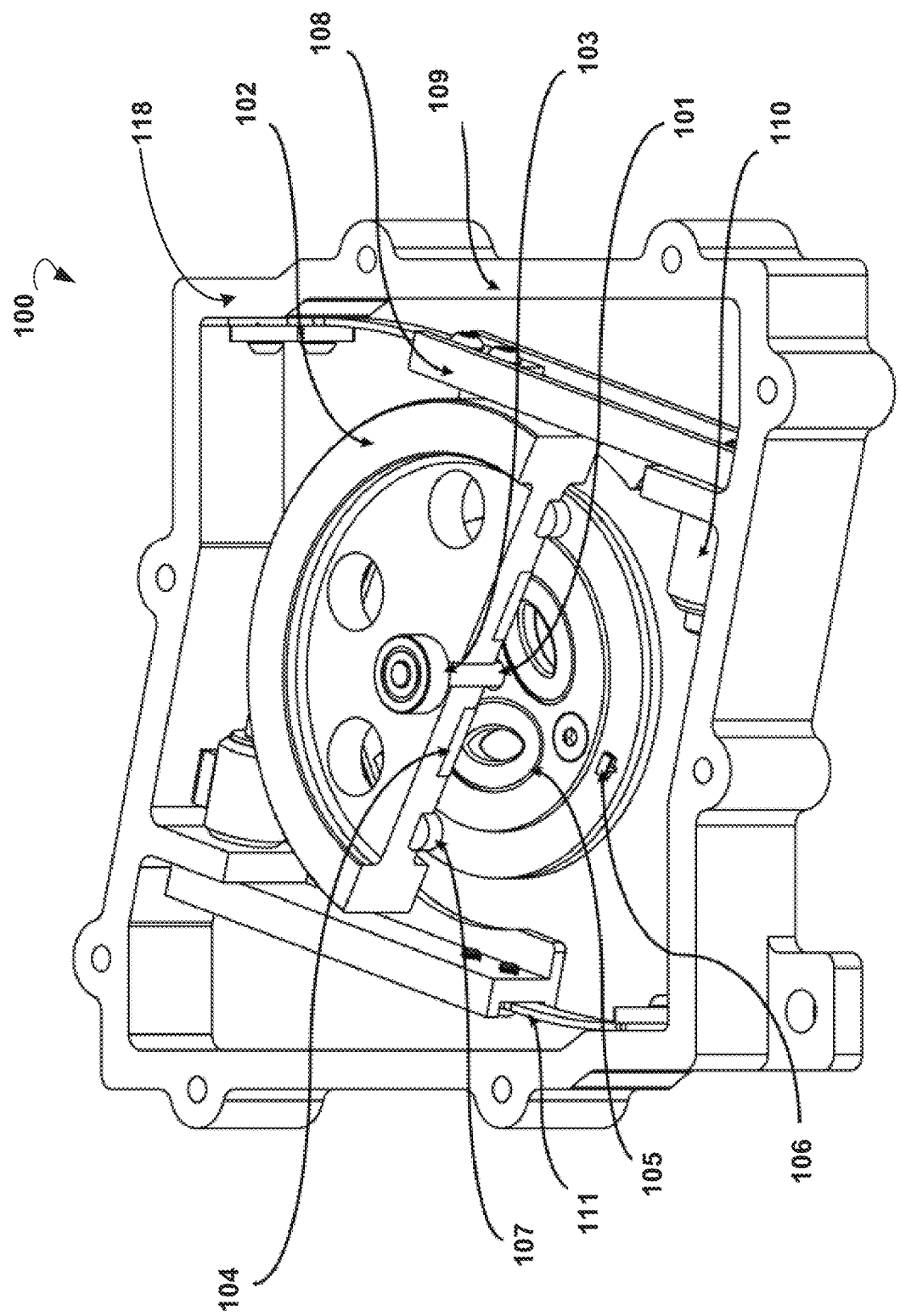
FIG. 1 is a top angle view of an example reaction wheel assembly.

The technology disclosed herein is concerned with providing ruggedized reaction wheels for use with kinetically launched satellites. A conventional reaction wheel may include a cylindrical rotating mass whose angular rate is controlled by an electric motor to manipulate an angular momentum of a satellite. The cylindrical rotating mass (a wheel) is mounted on a shaft. The shaft is held to the body of the satellite by bearings. The conventional reaction wheel may become inoperable after kinetic launch of the satellite for a variety of possible reasons caused by a high acceleration of the satellite, which may exceed Earth's gravity by 5,000 times. The main failure condition can include damage to the bearings. The magnified weight of the wheel during the acceleration can be too great for a bearing to withstand and, as a result, lack the ability to maintain the functionality necessary to control the satellite in orbit. There is an inverse relation between the rotational rate that a bearing can maintain before overheating and the load that it is able to withstand. High rotational rates are necessary for reaction wheels because they allow the wheel to store more angular momentum for a given weight, making them lighter overall. Moreover, the reaction wheel may fail due to a bending of the shaft. The reaction wheel may also fail due to a failure of the bond between the wheel and the shaft or the bond between the shaft and the bearing. A bond failure would result in the wheel sliding along the shaft with respect to the bearing or disconnection of the shaft from a bearing.

Embodiments of the present disclosure may allow protecting the shaft and the bearings of the reaction wheel from acceleration loading during a kinetic launch of a satellite in which the reaction wheel is installed. Some embodiments provide a support device that supports weight of the reaction wheel. The support device may transfer the load of the weight of the wheel directly to the primary structure of the satellite, thus preserving the bearing and the shaft by ensuring that they are not overloaded during the acceleration of the kinetic launch. The support device can be configured to release the wheel when the satellite is no longer under high acceleration loading. The wheel can then spin freely and control the attitude of the satellite. Release of the wheel can optionally include reorientation of the reaction wheel to allow it to produce torques on the satellite in a different direction.

According to one example embodiment of the present disclosure, a reaction wheel assembly is provided. The reaction wheel assembly may include a shaft mounted to a body of a satellite and a wheel mounted to the shaft. The center of a gravity of the wheel co-aligns with the shaft. The reaction wheel assembly may include a support device mounted to the body of the satellite. The support device can be engaged to support the wheel to reduce a load on the shaft. The load is caused by an acceleration of the satellite during a kinetic launch of the satellite.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 is a top view angle view of a reaction wheel assembly 100 installed in a body of a satellite, according to one embodiment of the present disclosure. The reaction wheel assembly of FIG. 1 is ruggedized to withstand loads caused by a kinetic launch of satellite. The reaction wheel assembly 100 may include a shaft 101 and a wheel 102. In FIG. 1, the wheel 102 is shown partially as cut in half to disclose other elements of the reaction wheel assembly 100. The wheel 102 is mounted to the shaft 101. The shaft 101 co-aligns with the center of gravity of the wheel 102. The shaft 101 is held to a wheel housing 109 by a pair of bearings. The wheel housing 109 can be directly attached to the primary structure of the satellite. One of the bearings is shown in FIG. 1 as bearing 103. The bearings may allow the wheel 102 to spin. The acceleration of the satellite is in a direction parallel with respect to the shaft 101.

The reaction wheel assembly 100 may further include a brushless DC electric motor. The brushless DC electric motor can be partially integrated into the wheel 102. The brushless DC electric motor may include an annular-shaped permanent magnet 104 integrated into the wheel 102, three magnetic coils 105 rigidly affixed to wheel housing 109, three hall effect sensors 106, and a pair of positioning magnets 107. The hall effect sensors 106 may sense the magnetic field of the positioning magnets 107. An electronic controller can be used to drive the brushless DC electric motor. The electronic controller may be configured to use data from the hall effect sensors 106 to determine a timing and direction of electric current to apply to the magnetic coils 105, thereby controlling the rotation of the wheel 102.

The reaction wheel assembly 100 may further include a pair of support blocks 108. The support blocks 108 can be located at opposite sides with respect to the center of the gravity of the wheel 102. The support blocks 108 can be attached to springs 111 by one end. The springs 111 can be attached by first ends to one of the support blocks 108 and by second ends to an edge 118 of the wheel housing 109.

During a kinetic launch of a satellite, the support blocks 108 are located at least partially between the wheel 102 and a surface of the wheel housing 109, such that the wheel 102 rests on the support blocks 108 and is not allowed to spin. Since the wheel 102 rests on the supporting blocks 108, the bearings and the shaft 101 do not receive the weight of the wheel 102; therefore, the bearings and the shaft 101 can be protected from an excessive loading due to acceleration of the kinetic launch of satellite. The acceleration may exceed a standard acceleration due to earth gravity by 5,000 times in a direction parallel with respect to the shaft 101.

The reaction wheel assembly 100 may further include a pair of release devices 110 (separation mechanisms). The release devices 110 can be used to secure the support blocks 108 between the wheel 102 and the surface of the wheel housing 109 during the kinetic launch of the satellite. When the support blocks 108 are secured between the wheel 102 and the surface of the wheel housing 109, the springs 111 are compressed. When the satellite is in orbit, the release devices 110 may release the supports blocks 108. As a result, the extension of springs 111 causes the support blocks 108 to move from positions between the wheel 102 and the surface of the wheel housing 109. When the support blocks 108 are released, the wheel 102 can spin, such that the reaction wheel assembly 100 may operate in a conventional manner to control an orientation of the satellite.

Figure 2:
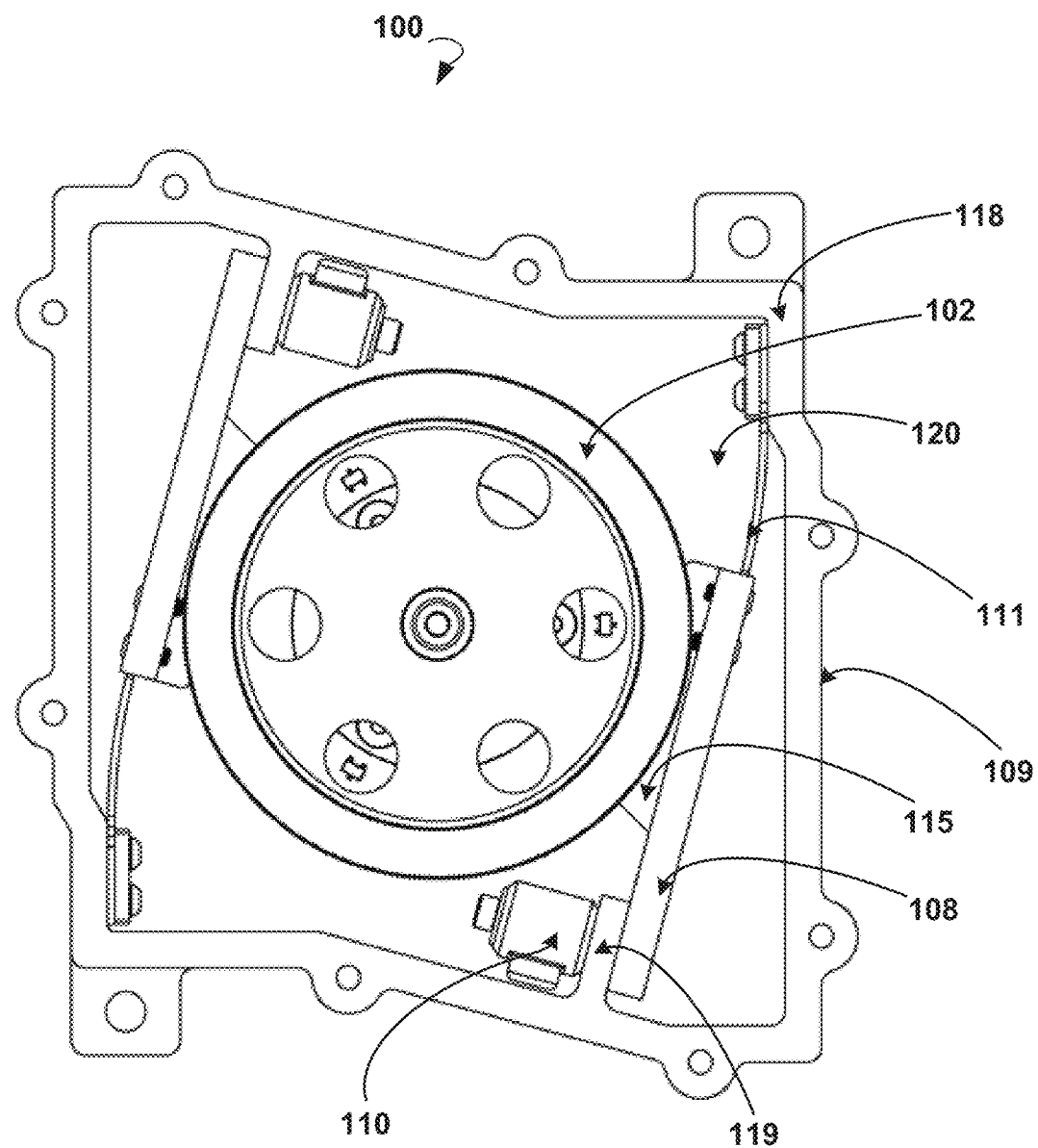
FIG. 2 is a top view of the example reaction wheel assembly of FIG. 1 during a kinetic launch.

FIG. 2 is a top view of the reaction wheel assembly 100 installed in a body of a satellite. FIG. 2 shows the positions of the support blocks 108 during a kinetic launch of the satellite. Parts 115 of the support blocks 108 are located between the wheel 102 and a surface 120 of the wheel housing 109. The support blocks 108 are secured by the release devices 110 to consoles 119 projected from the edge 118 of the wheel housing 109 when springs 111 are compressed.

Figure 3:
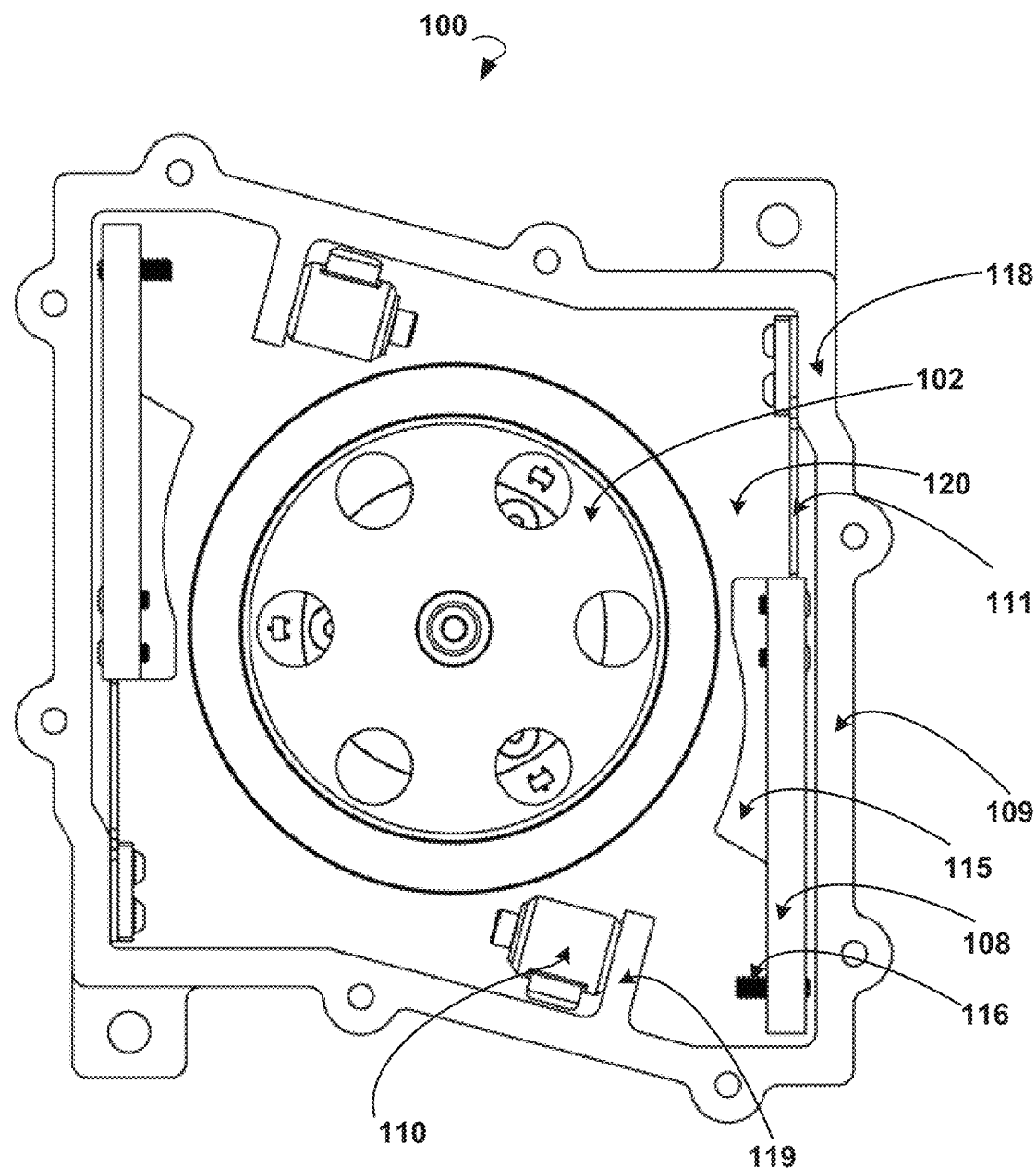
FIG. 3 is a top view of the example reaction wheel assembly of FIG. 1 after the kinetic launch.

FIG. 3 is a top view of the reaction wheel assembly 100 installed in a body of a satellite. FIG. 3 shows the positions of the support blocks 108 after the kinetic launch of the satellite, when the satellite is in space. Parts 115 of the support blocks 108 are not located between the wheel 102 and surface 120 of the wheel housing 109 attached to the body of the satellite, thereby allowing the wheel 102 to spin. The support blocks 108 can be released from the positions between the wheel 102 and the surface 120 by extension of the springs 111. The springs 111 are extended after the release devices 110 release the support blocks 108 from the consoles 119. Prior to release, the support blocks 108 can be secured by the release devices 110 to consoles 119 using bolts 116. The bolts 116 can be configured to be screwed into the release devices 110 through the consoles 119 projected from edge 118 of the wheel housing 109 attached to the body of the satellite.

Figure 4:
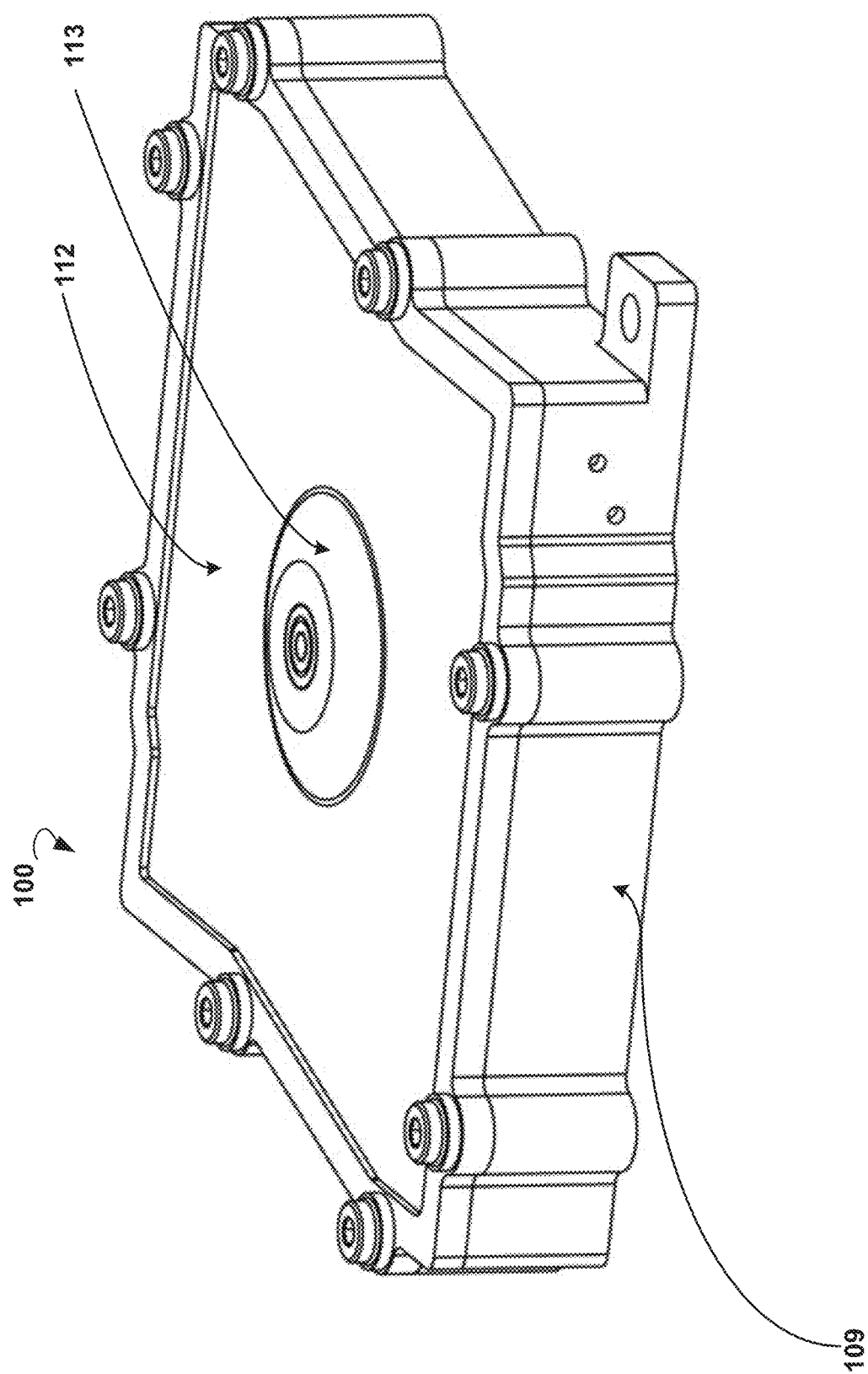
FIG. 4 is a top angle view of the example reaction wheel of FIG. 1 protected with a cover.

FIG. 4 is a top angle view of an example reaction wheel assembly 100 protected with a cover 112. The cover 112 can be used to cover a box formed by an edge of the wheel housing 109. The cover 112 may include a boss 113. The boss 113 can be shaped to accept the bearings 103.

Figure 5:
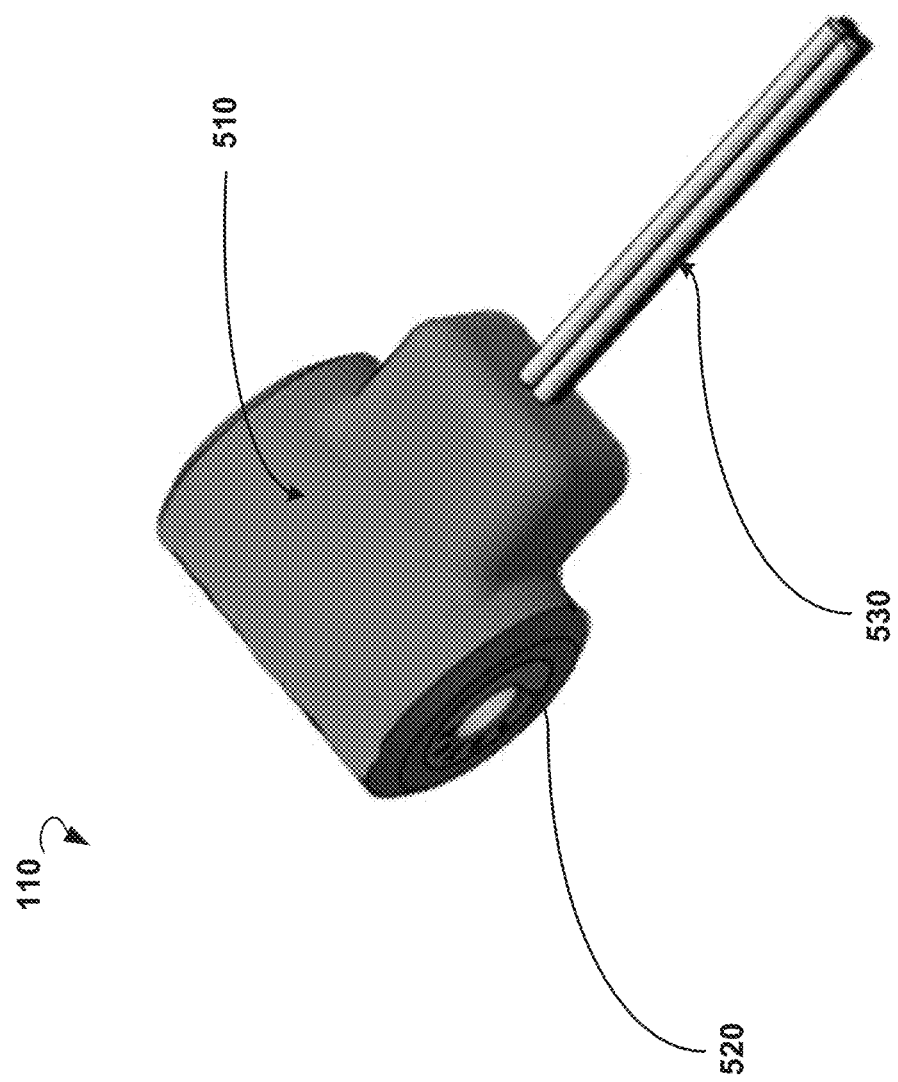
FIG. 5 shows an example release device for use in the reaction wheel assembly.

FIG. 5 shows an example release device 110 that can be used to secure and release the support blocks 108, according to some embodiments of the present disclosure. The release device 110 may include a non-explosive device (for example, a Frangibolt™ release device). The release device 110 may comprise a body 510, a collar 520, and electric wires 530. The collar 520 can be made of shape memory alloy (SMA) (for example, a nickel-titanium alloy). The collar 520 may be configured to accept one of the bolts 116 shown in FIG. 3. The release device 110 may utilize a shape memory effect to produce forces that break the bolts 116, and thus releasing the support blocks 108. The collar 520 can be heated by an integral heater (not shown) attached to the electric wires 530. The heating of the collar 520 made of the SMA expands the collar and breaks the bolts 116.

Figure 6:
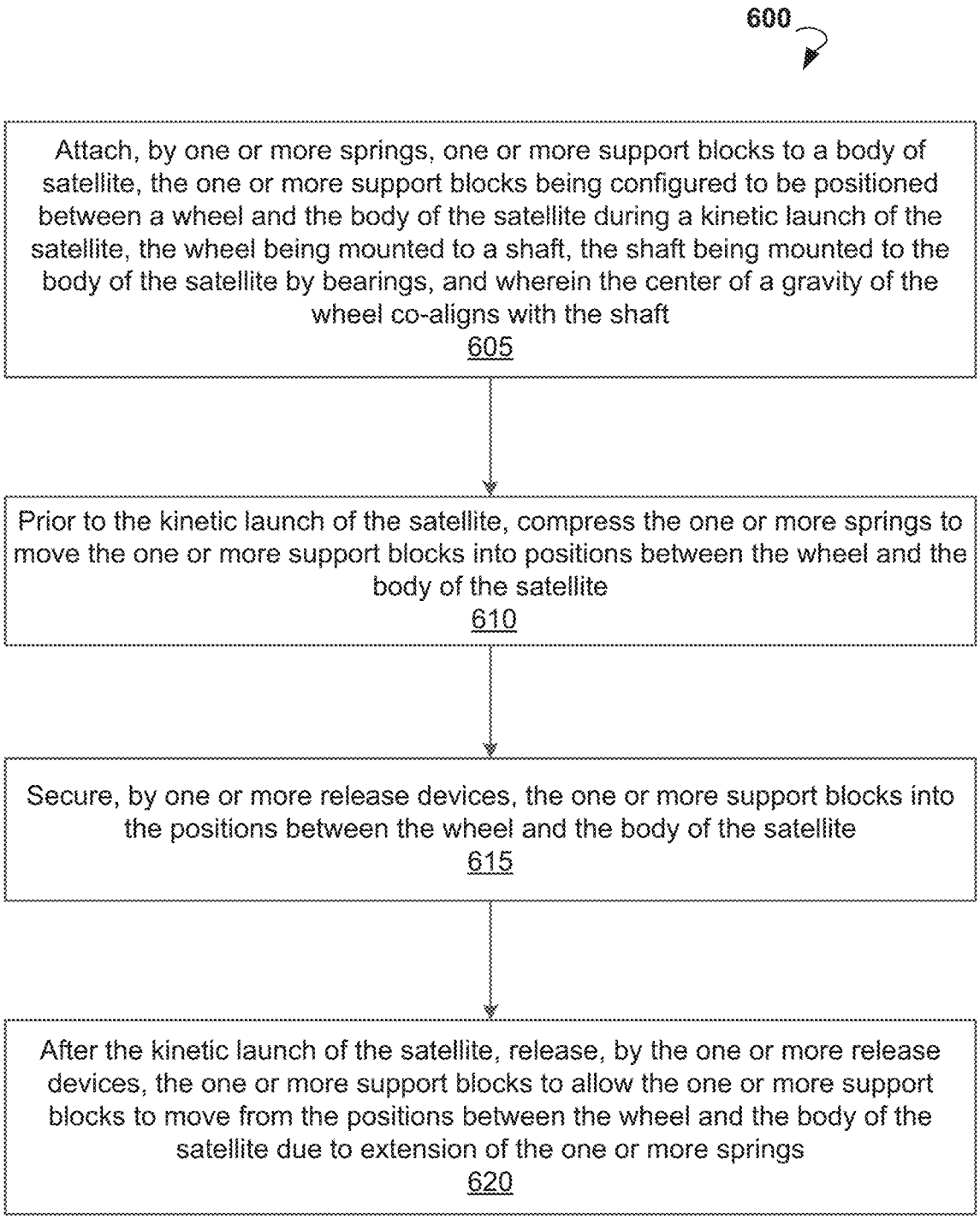
FIG. 6 is flow chart showing an example method for ruggedizing a reaction wheel during a kinetic satellite launch.

FIG. 6 is a flow chart showing an example method 600 for ruggedizing a reaction wheel during a kinetic satellite launch. The method 600 may commence in block 605 with attaching, by one or more springs, one or more support blocks to a body of a satellite. The support blocks can be configured to be positioned between a wheel and the body of the satellite during a kinetic launch of the satellite. The wheel can be mounted to a shaft. The shaft can be mounted to the body of the satellite by bearings. The center of gravity of the wheel is co-aligned with the shaft. If there is more than one support block, the supports blocks can be located symmetrically with respect to the center of gravity of the wheel.

In block 610, the method 600 may include, prior to the kinetic launch of the satellite, compressing the springs to move the support blocks into positions between the wheel and the body of the satellite. The support blocks may support the wheel to reduce a load on the shaft. The load may be caused by an acceleration during the kinetic launch. The direction of the acceleration can be parallel to the shaft and exceed a standard acceleration due to earth gravity by at least 5,000 times. The support blocks may prevent the wheel from spinning. The springs may include non-coil springs or coil springs.

In block 615, the method 600 may proceed with securing, by one or more release devices, the support blocks into the positions between the wheel and the body of the satellite. The release devices may include non-explosive release devices with a shape memory alloy.

In block 620, after the kinetic launch, the method 600 may proceed with releasing, by the one or more release devices, the support blocks to allow the support blocks to move from the positions between the wheel and the body of the satellite by extension of the springs.

Figure 7:
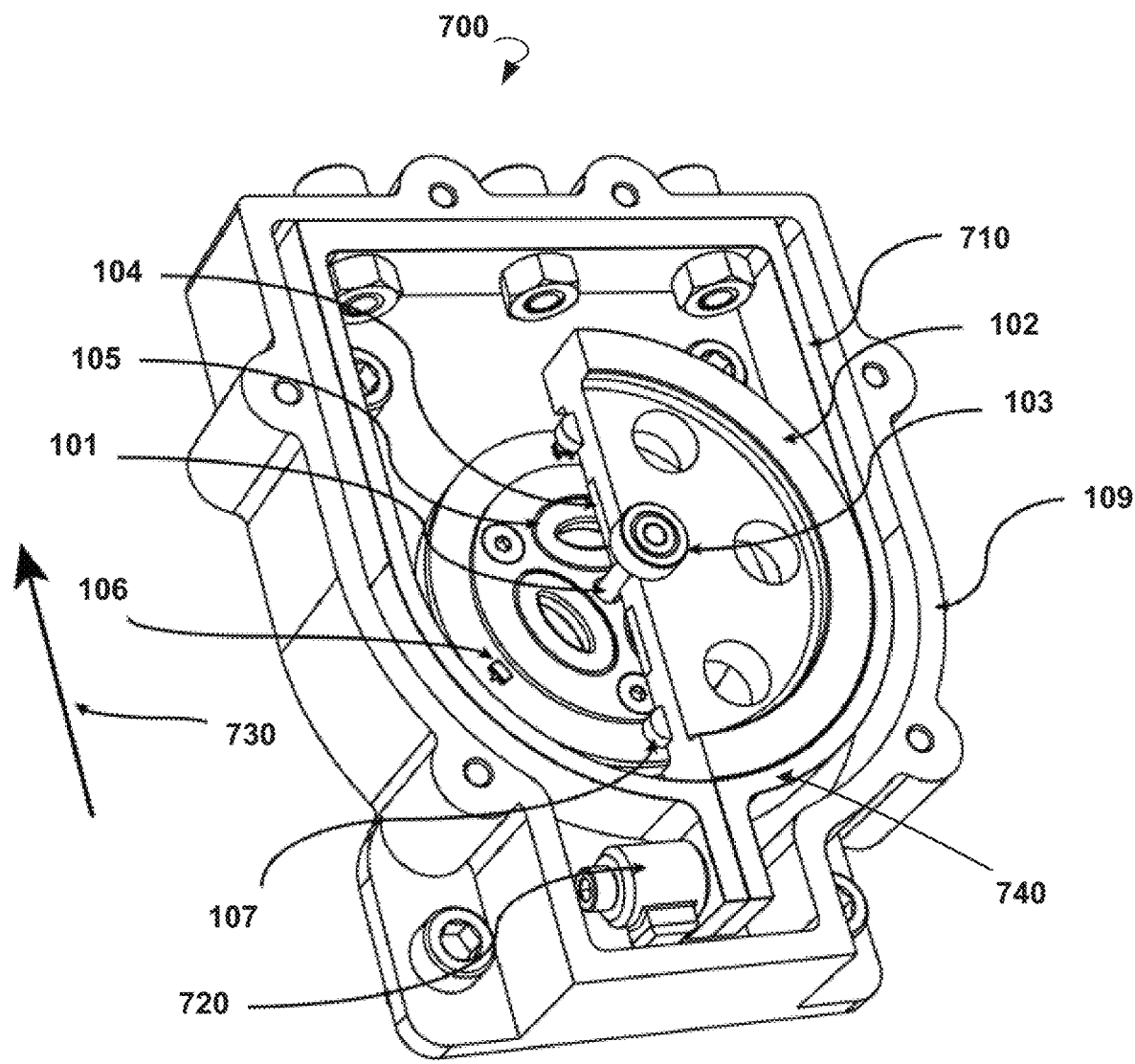
FIG. 7 is a top angle view of an example reaction wheel assembly, according to one example embodiment.

FIG. 7 is a top angle view of an example reaction wheel assembly 700 installed in a body of a satellite, according to one example embodiment. Similar to the reaction wheel assembly 100 shown in FIG. 1, the reaction wheel assembly 700 includes a shaft 101 and a wheel 102 mounted to the shaft 101. The shaft 101 is co-aligned with the center of the gravity of the wheel 102. The shaft 101 is held to a wheel housing 109 by a pair of bearings. The wheel housing 109 can be directly attached to the primary structure of the satellite. One of the bearings is shown in FIG. 7 as bearing 103. The bearings allow the wheel 102 to spin. The reaction wheel assembly 700 may further include a brushless DC electric motor. The brushless DC electric motor can be partially integrated into the wheel 102. The brushless DC electric motor may include an annular-shaped permanent magnet 104 integrated into the wheel 102, three magnetic coils 105 rigidly affixed to the wheel housing 109, three hall effect sensors 106, and a pair of positioning magnets 107. The hall effect sensors 106 may sense the magnetic field of the positioning magnets 107. An electronic controller can be used to drive the brushless DC electric motor. The electronic controller may be configured to use data from the hall effect sensors 106 to determine a direction and timing of the electric current to apply to through the magnetic coils 105, thereby controlling the rotation of the wheel 102.

The reaction wheel assembly 700 may further include a suspension member 710. The suspension member 710 is affixed to the body of the wheel housing 109 on one side of the wheel 102. The suspension member 710 may include "legs" 740 to support the wheel 102 during high acceleration loads of a kinetic launch, such that the bearings 103 and the shaft 101 do not need to support the weight of the wheel 102. Numerical 730 shows the direction 730 of the acceleration perpendicular to the shaft 101. During the kinetic launch, the "legs" 740 of the suspension member 710 can be secured to each other by a release device 720. The release device 720 may have the functionality similar to the release devices 110 in the reaction wheel assembly 100 shown in FIG. 1. While being secured, the "legs" 740 of the suspension member 710 are compressed. After satellite is launched into space, the "legs" 740 can be released by the release device 720. The "legs" 740 can be separated from each other due to internal compression energy, thus freeing the wheel 102 to rotate and control the attitude of the satellite.

Figure 8:
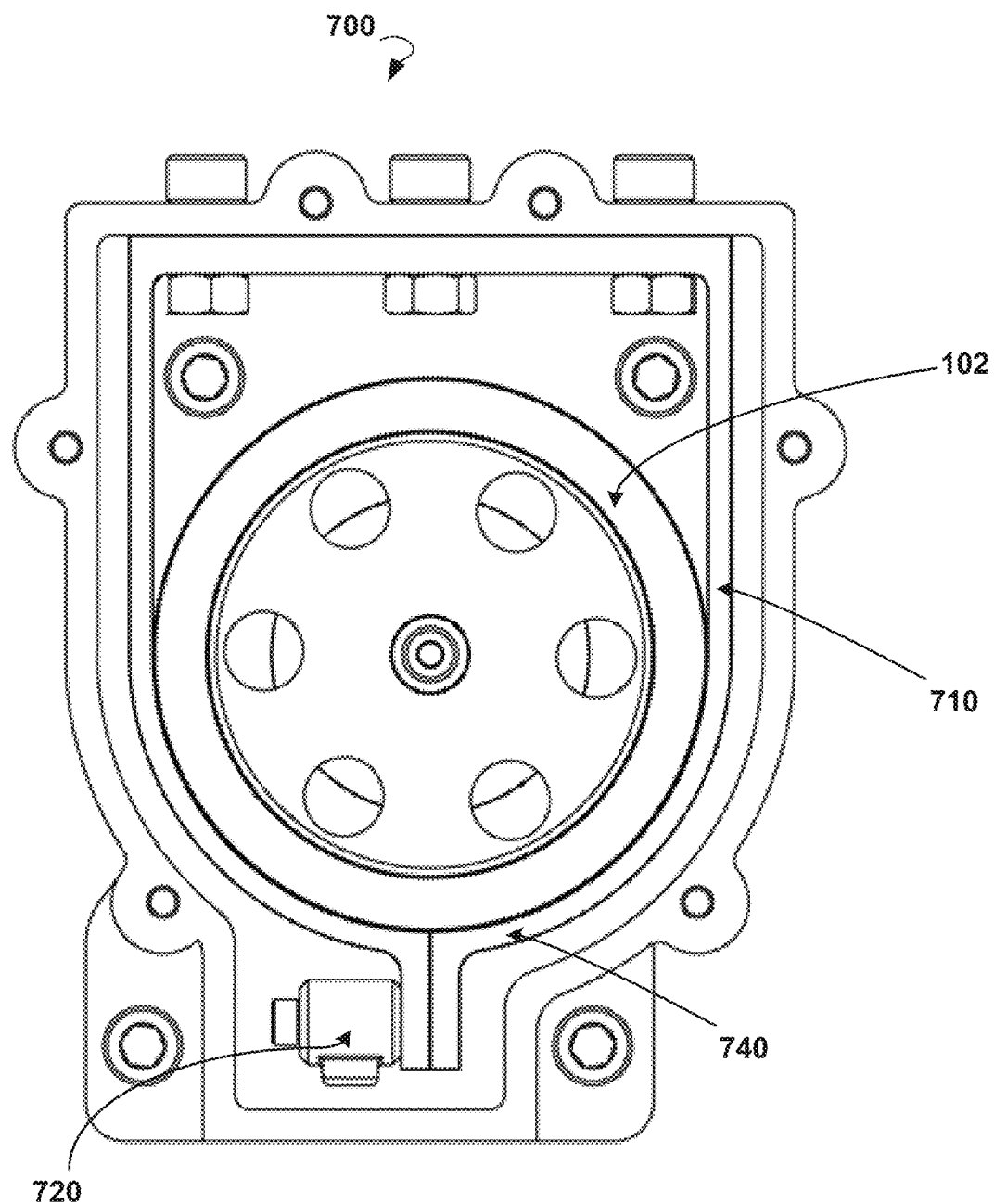
FIG. 8 is a top view of the example reaction wheel assembly of FIG. 7 during a kinetic launch.

FIG. 8 is a top view of the example reaction wheel assembly 700 during a kinetic launch. The "legs" 740 of the suspension member 710 are secured to each other by the release device 720. When being secured, the "legs" support 740 the wheel 102.

Figure 9:
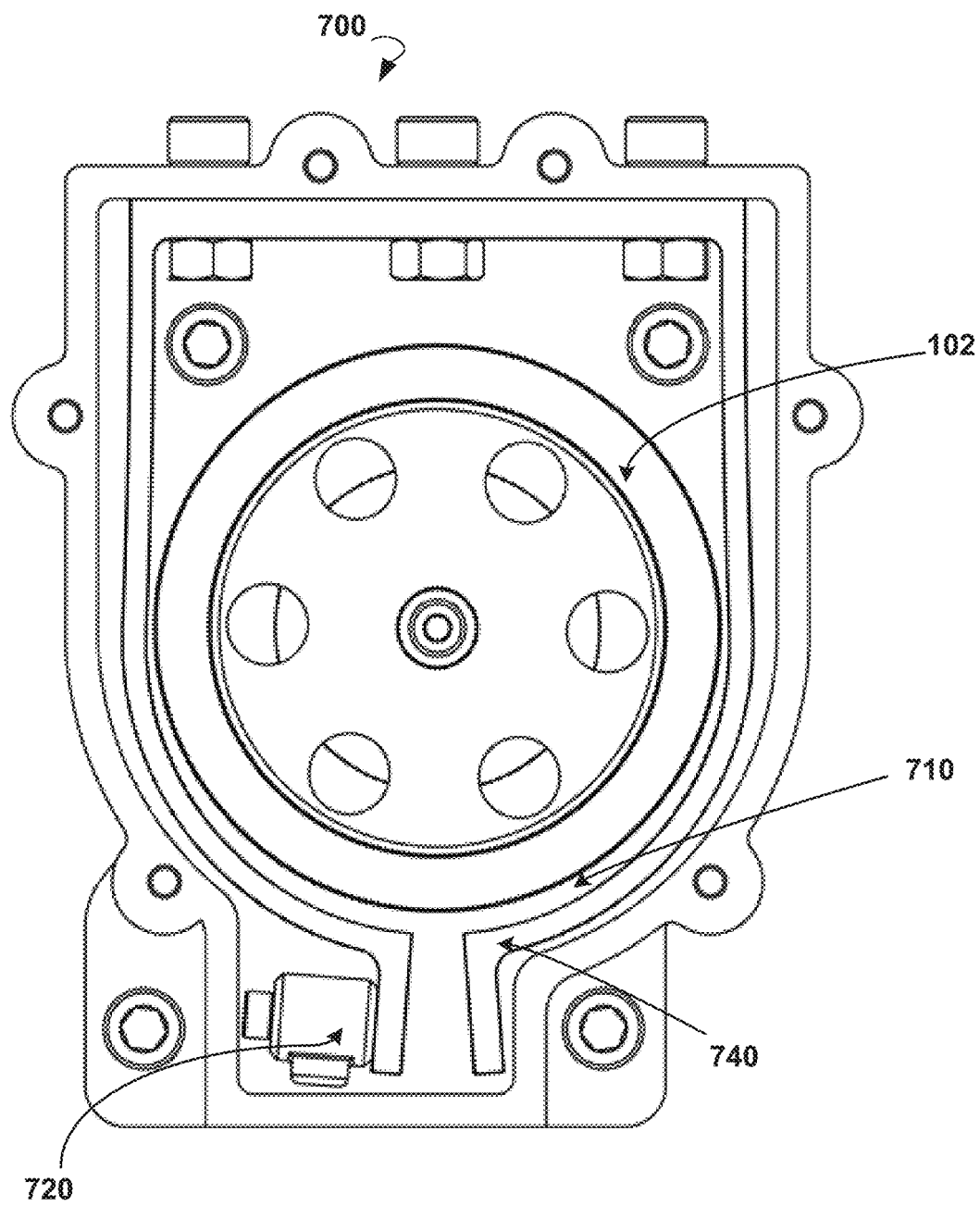
FIG. 9 is a top view of the example reaction wheel assembly of FIG. 7 after the kinetic launch.

FIG. 9 is a top view of the example reaction wheel assembly 700 after the kinetic launch. The release device 720 device releases the "legs" 740 of the suspension member 710, such that the "legs" 740 stop supporting the wheel 102 and the wheel 102 is allowed to spin and, optionally, reorient the satellite.

Figure 10:
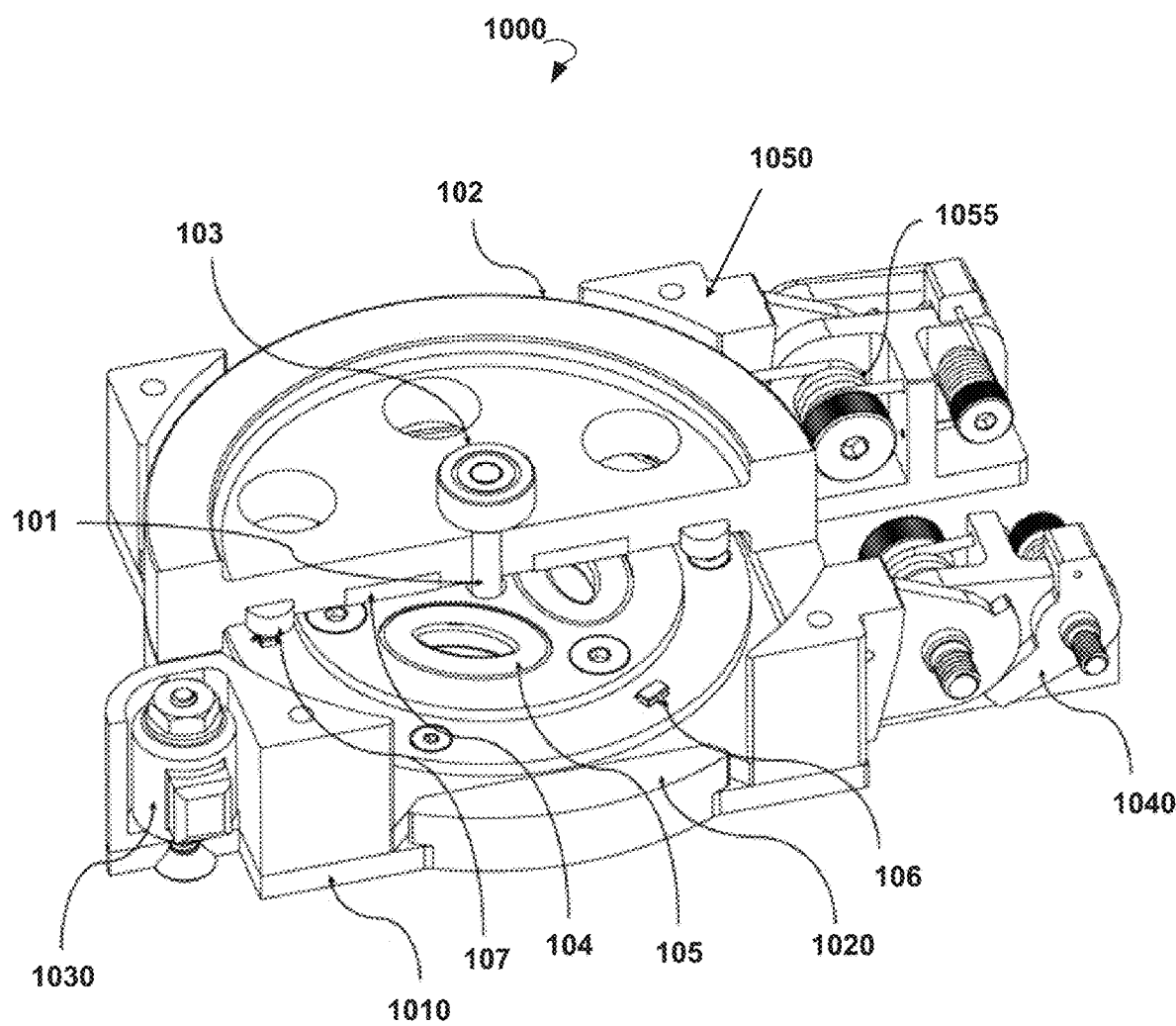
FIG. 10 is a top angle view of an example reaction wheel assembly, according to one example embodiment.

FIG. 10 is a top angle view of an example reaction wheel assembly 1000 installed in a body of a satellite, according to one example embodiment. The reaction wheel assembly 1000 includes a shaft 101 and a wheel 102 mounted to the shaft 101. The shaft 101 is co-aligned with the center of gravity of the wheel 102 and held to a wheel housing 1050 by a pair of bearings. One of the bearings is shown in FIG. 10 as bearing 103. The bearings may allow the wheel 102 to spin. The wheel housing 1050 is attached to a primary structure 1010 of the satellite via a pair of sprung hinges 1055.

The reaction wheel assembly 1000 may further include a brushless DC electric motor. The brushless DC electric motor can be partially integrated into the wheel 102. The brushless DC electric motor may include an annular-shaped permanent magnet 104 integrated into the wheel 102, three magnetic coils 105 rigidly affixed to the wheel housing 1050, three hall effect sensors 106, and a pair of positioning magnets 107. The hall effect sensors 106 may sense the magnetic field of the positioning magnets 107. An electronic controller can be used to drive the brushless DC electric motor. The electronic controller may be configured to use data from the hall effect sensors 106 to determine a direction and timing of electric current to apply to the magnetic coils 105, thereby controlling the rotation of the wheel 102.

During the acceleration of kinetic launch, the wheel housing 1050 is secured parallel to the primary structure 1010 of the satellite by a release device 1030. The release device 1030 may have the same functionality as the release device 110 in the reaction wheel assembly 100 of FIG. 1. The wheel 102 rests on the support blocks 1020 during high acceleration loads of the kinetic launch of the satellite. The direction of the acceleration is assumed to be parallel to the shaft 101. The support blocks 1020 are directly connected to the primary structure 1010 of the satellite. Therefore, the weight of the wheel 102 is transferred directly to the primary structure 1010 of the satellite through the support blocks 1020 such that the bearings 103 and the shaft 101 does not need to support the increased weight of the wheel 102.

After the satellite is launched into space, the release device 1030 may release the body 1050 to allow the reaction wheel assembly 1000 to swing around the pair of the sprung hinges 1055 to a stop position. The pair of the spring-operated latches 1040 secures the reaction wheel assembly 1000 into the stop position. Lifting the reaction wheel assembly 1000 off the support blocks 1020 allows the wheel 102 to spin and control the attitude of the satellite.

Figure 11:
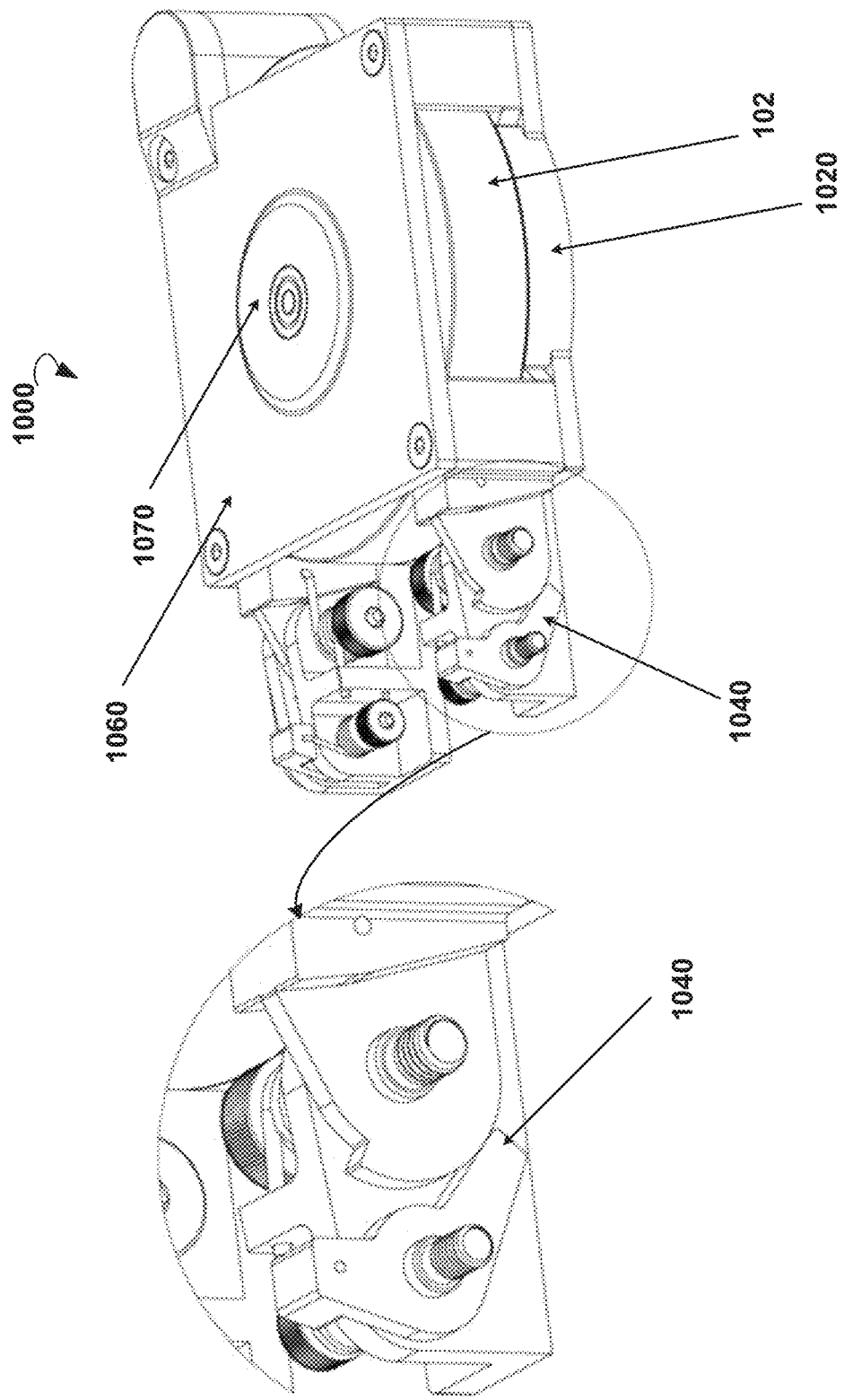
FIG. 11 is a top angle view of the example reaction wheel assembly of FIG. 10 during a kinetic launch.

FIG. 11 is a top angle view of the example reaction wheel assembly 1000 during a kinetic launch. The reaction wheel assembly 1000 is protected by a cover 1060. The cover 1060 includes a boss 1070 to accept the bearing 103. The wheel 102 rests on the support blocks 1020. The spring-operated latches 1040 are in unlocked positions.

Figure 12:
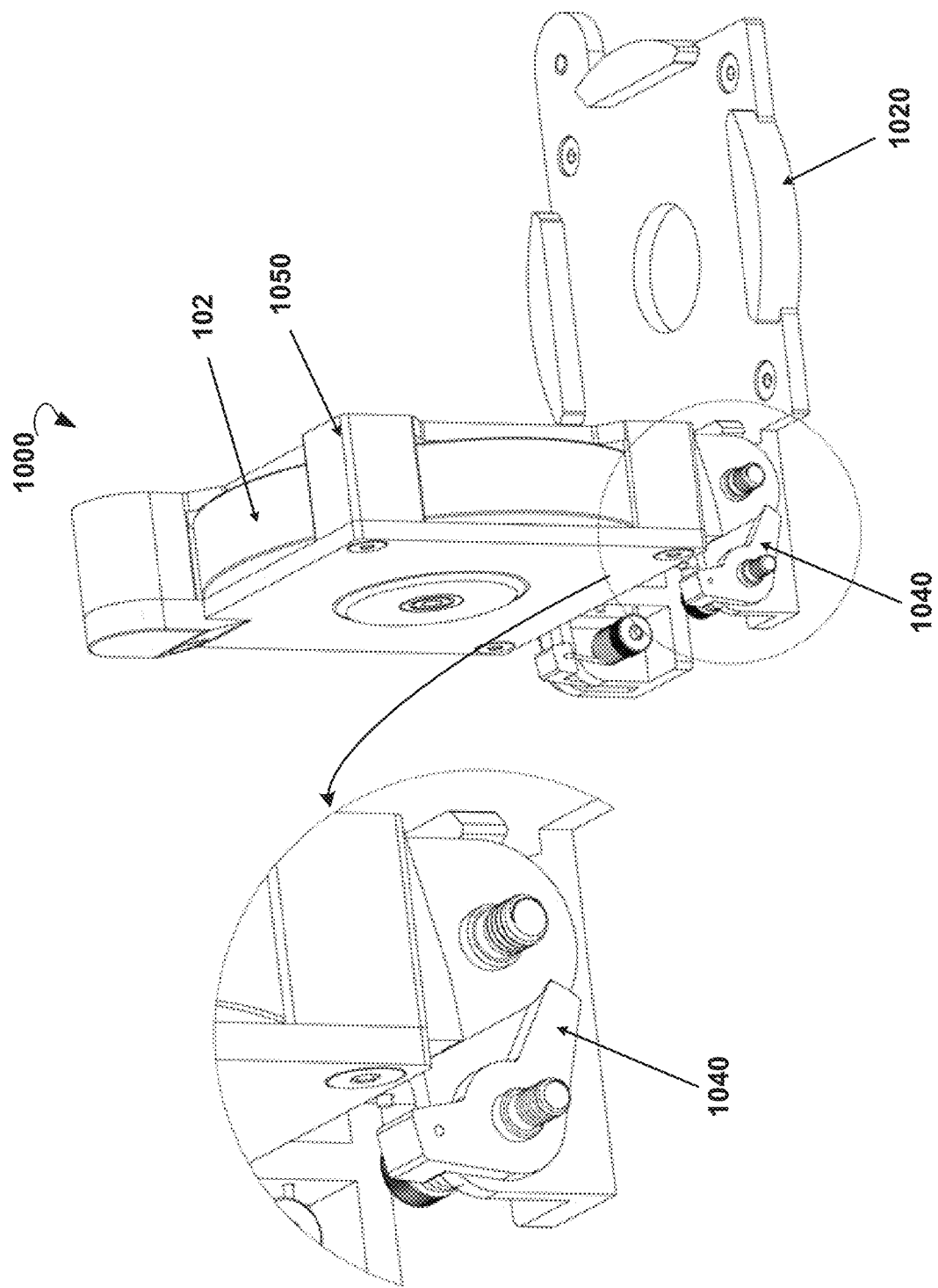
FIG. 12 is a top angle view of the example reaction wheel assembly of FIG. 10 after the kinetic launch.

FIG. 12 is a top angle view of the example reaction wheel assembly 1000 installed in a body of a satellite after the kinetic launch. The wheel housing 1050 of the reaction wheel assembly 1000 is moved away from the support blocks 1020, allowing the wheel 102 to spin. The spring-operated latches 1040 secure the position of the wheel 102 with respect to the primary structure of the satellite.

Figure 13:
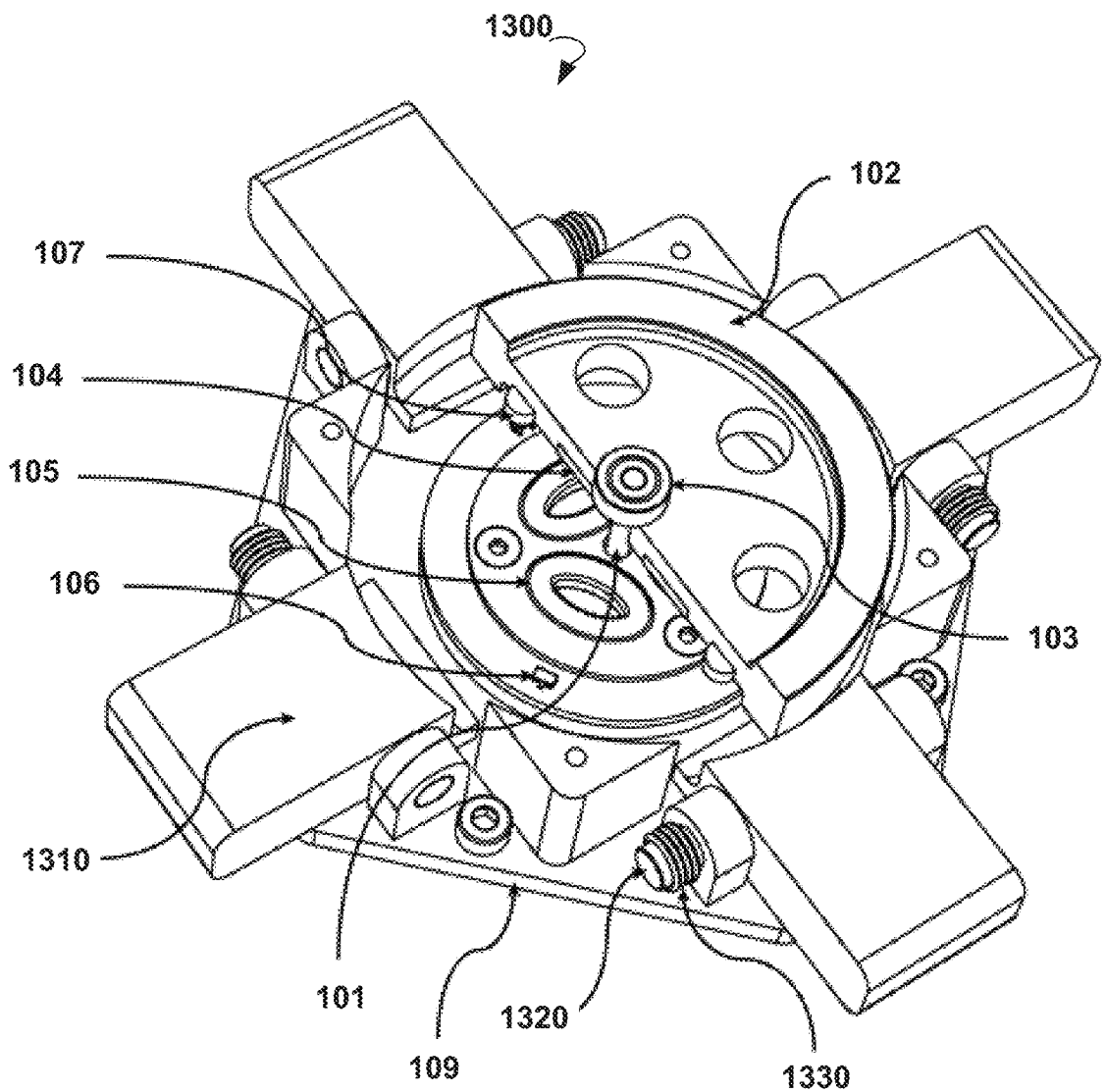
FIG. 13 is a top angle view of an example reaction wheel assembly, according to one example embodiment.

FIG. 13 is a top angle view of an example reaction wheel assembly 1300 installed in a body of a satellite, according to one example embodiment. Similar to the reaction wheel assembly 100 of FIG. 1, the reaction wheel assembly 1300 includes a shaft 101 and a wheel 102 mounted to the shaft 101. The shaft 101 is co-aligned with the center of gravity of the wheel 102 and held to a wheel housing 109 by a pair of bearings. The wheel housing 109 is directly attached to the primary structure of the satellite. The bearings shown in FIG. 13 as bearings 103 may allow the wheel 102 to spin. The reaction wheel assembly 1300 may further include a brushless DC electric motor. The brushless DC electric motor can be at least partially integrated into the wheel 102. The brushless DC electric motor may include an annular-shaped permanent magnet 104 integrated into the wheel 102, three magnetic coils 105 rigidly affixed to the wheel housing 109, three hall effect sensors 106, and a pair of positioning magnets 107. The hall effect sensors 106 may sense the magnetic field of the positioning magnets 107. An electronic controller can be used to drive the brushless DC electric motor. The electronic controller may be configured to use data from the hall effect sensors 106 to determine a direction and timing of the electric current to apply to the magnetic coils 105, thereby controlling the rotation of the wheel 102.

The reaction wheel assembly 1300 may further include balance supports 1310. During acceleration, each of the balance supports 1310 may swing under their own weight until they stop at a position that supports the wheel 102. The weighted end on the outer side of the balance support 1310 can counteract the weight of the reaction wheel 102 that is applied to the other end of the balance support 1310 on the opposite side of a hinge pin 1320. The weight of the wheel 102 is transferred directly to the wheel housing 109, and thus to the primary structure of the satellite, through the balance support hinge pin 1320, such that the bearings 103 and the shaft 101 do not need to support the wheel 102.

After the satellite is no longer under high acceleration loads, torsional springs 1330 can turn the balance supports 1310 away from the wheel 102, thereby allowing the wheel 102 to spin freely and control the attitude of the satellite.

Figure 14:
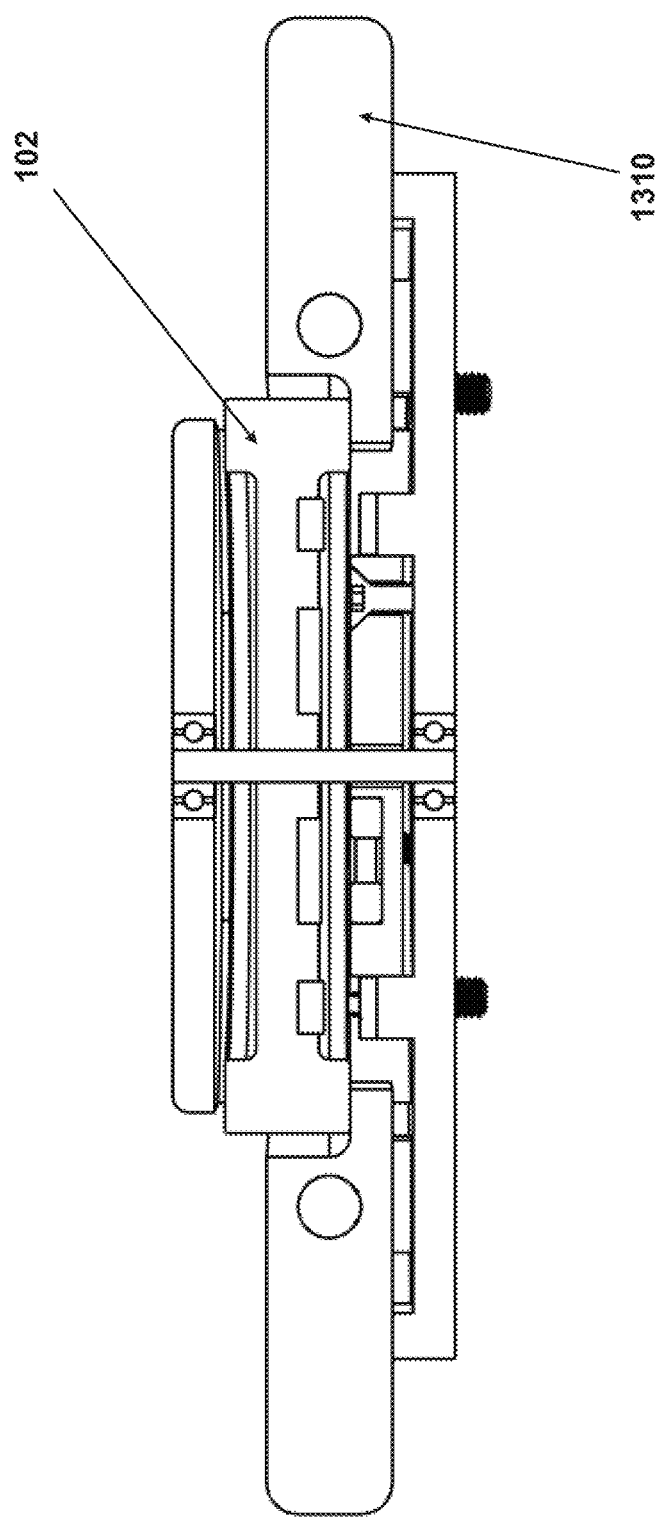
FIG. 14 is a cross section of the example reaction wheel assembly of FIG. 13 during a kinetic launch.
Figure 15:
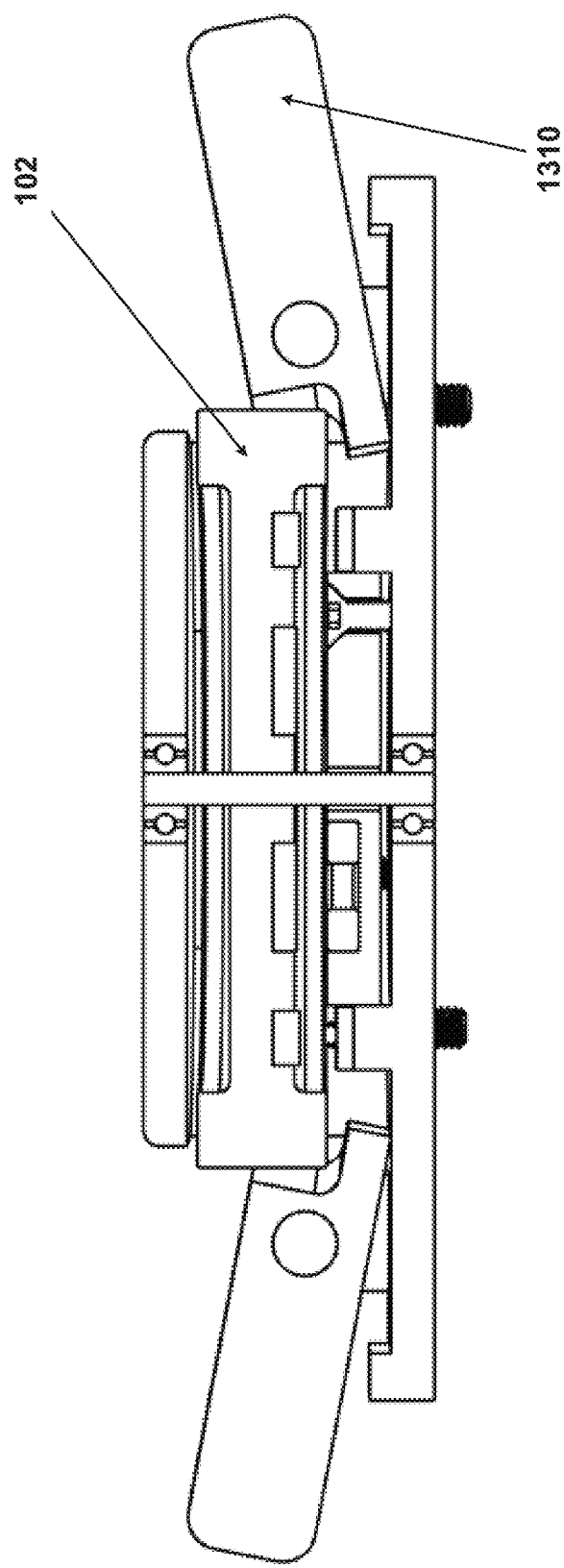
FIG. 15 is a cross section of the example reaction wheel assembly of FIG. 13 after the kinetic launch.

FIG. 14 is a cross section of the reaction wheel assembly 1300 showing the position of the support blocks 1310 during a kinetic launch with support blocks 1310 supporting the wheel 102. FIG. 15 is a cross section of the reaction wheel assembly 1300 showing the position of the support blocks 1310 after the satellite is launched into space with the supports blocks 1310 having no contact with the wheel 102 such that the wheel 102 can spin freely.

The present technology is described above with reference to example embodiments. Therefore, other variations upon the example embodiments are intended to be covered by the present disclosure.

What is claimed is:

1. A reaction wheel assembly comprising:
   a wheel housing;
   a shaft mounted to the wheel housing;
   a wheel mounted to the shaft, wherein a center of a gravity of the wheel is co-aligned with the shaft; and
   a support device mounted to the wheel housing, wherein the support device is engaged to support the wheel to reduce a load on the shaft, the load being caused by an acceleration of a satellite during a kinetic launch of the satellite, wherein the support device comprises:
      one or more support blocks configured to be positioned between the wheel and the wheel housing to support the wheel during the kinetic launch of the satellite;
      one or more springs, a first end of the one or more springs being attached to the wheel housing and a second end of the one or more springs being attached to the one or more support blocks, the one or more springs compressing when the one or more support blocks are placed between the wheel and the wheel housing; and
      one or more release devices attached to the wheel housing, the one or more release devices being configured to secure the one or more support blocks between the wheel and the wheel housing during the kinetic launch of the satellite.

2. The reaction wheel assembly of claim 1, wherein the support device is disposed between the wheel and the wheel housing during the kinetic launch of the satellite.

3. The reaction wheel assembly of claim 1, wherein the support device is disengaged from supporting the wheel once the acceleration is below a predetermined value.

4. The reaction wheel assembly of claim 3, wherein the support device includes a lip configured to contact a side of the wheel when the support device is engaged.

5. The reaction wheel assembly of claim 3, wherein the support device is released by moving the support device while keeping positions of the shaft and the wheel with respect to the wheel housing.

6. The reaction wheel assembly of claim 1, wherein the acceleration of the satellite during the kinetic launch exceeds a standard acceleration due to gravity by at least 5,000 times and direction of the acceleration is constant with respect to the satellite.

7. The reaction wheel assembly of claim 1, further comprising bearings for holding the shaft to the wheel housing and allowing a rotation of the wheel; and
   wherein the support device is configured to support the wheel to reduce the load on the bearings.

8. The reaction wheel assembly of claim 1, further comprising an electric motor configured to cause a rotation of the wheel around the shaft, the electric motor comprising:
   one or more permanent magnets rigidly affixed to one of the wheel or the shaft;
   one or more positioning magnets;
   one or more magnetic coils rigidly affixed to the wheel housing;
   one or more hall effect sensors rigidly affixed to the wheel housing, the one or more hall effect sensors being configured to determine, based on a magnetic field of the one or more positioning magnets, data including a speed of the wheel and a rotational position of the wheel; and an electronic controller operable to:
read the data from the one or more hall effect sensors; and
determine, based on the data, a direction of an electric current to apply to one or more magnetic coils.

9. The reaction wheel assembly of claim 8, wherein the one or more positioning magnets are integrated into the wheel.

10. The reaction wheel assembly of claim 1, wherein there is more than one support block positioned to support opposite halves of the wheel with respect to the center of gravity of the wheel.

11. The reaction wheel assembly of claim 1, wherein the one or more release devices are further configured to release the one or more support blocks, thereby causing the one or more springs to move the one or more support blocks from a position between the wheel and the wheel housing.

12. The reaction wheel assembly of claim 1, wherein the one or more release devices include a non-explosive release device, the non-explosive release device including a shape memory alloy.

13. A method of reducing a load on a reaction wheel assembly, the method comprising:
positioning a support device to engage a reaction wheel assembly, wherein the engaged support device supports the reaction wheel assembly to reduce a load on a shaft of the reaction wheel assembly, the load being caused by an acceleration of a satellite during a kinetic launch of the satellite; and
wherein the reaction wheel assembly comprises a wheel housing, the shaft mounted to the wheel housing, a wheel mounted to the shaft, and wherein a center of a gravity of the wheel is co-aligned with the shaft;
wherein the support device comprises:
one or more support blocks configured to be positioned between the wheel and the wheel housing to support the wheel during the kinetic launch of the satellite;
one or more springs, a first end of the one or more springs being attached to the wheel housing and a second end of the one or more springs being attached to the one or more support blocks, the one or more springs compressing when the one or more support blocks are placed between the wheel and the wheel housing; and
one or more release devices attached to the wheel housing, the one or more release devices being configured to secure the one or more support blocks between the wheel and the wheel housing during the kinetic launch of the satellite.

14. The method of claim 13, wherein the support device is disposed between the wheel and the wheel housing during the kinetic launch of the satellite.

15. The method of claim 13, further comprising:
disengaging the support device from supporting the wheel, wherein the disengaging occurs once the acceleration is below a predetermined value.

16. The method of claim 15, wherein the support device includes a lip configured to contact a side of the wheel when the support device is engaged.

17. The method of claim 15, wherein the disengaging the support device is by moving the support device while keeping positions of the shaft and the wheel with respect to the wheel housing.

18. The method of claim 13, wherein the reaction wheel assembly further comprises bearings for holding the shaft to the wheel housing and allowing a rotation of the wheel; and
wherein the support device is configured to support the wheel to reduce the load on the bearings.

19. A reaction wheel assembly comprising:
a wheel housing;
a shaft mounted to the wheel housing;
a wheel mounted to the shaft, wherein a center of a gravity of the wheel is co-aligned with the shaft;
bearings for holding the shaft to the wheel housing and allowing a rotation of the wheel;
a support device mounted to the wheel housing;
an electric motor configured to cause a rotation of the wheel around the shaft, the electric motor comprising:
one or more permanent magnets rigidly affixed to one of the wheel or the shaft;
one or more positioning magnets;
one or more magnetic coils rigidly affixed to the wheel housing;
one or more hall effect sensors rigidly affixed to the wheel housing, the one or more hall effect sensors being configured to determine, based on a magnetic field of the one or more positioning magnets, data including a speed of the wheel and a rotational position of the wheel; and
an electronic controller operable to:
read the data from the one or more hall effect sensors; and
determine, based on the data, a direction of an electric current to apply to one or more magnetic coils,
wherein the support device is engaged to support the wheel to reduce a load on the shaft and bearings, the load being caused by an acceleration of a satellite during a kinetic launch of the satellite, the support device disposed between the wheel and the wheel housing during the kinetic launch of the satellite, wherein the support device is disengaged from supporting the wheel by moving the support device while keeping positions of the shaft and the wheel with respect to the wheel housing once the acceleration is below a predetermined value, and
wherein the support device comprises:
one or more support blocks configured to be positioned between the wheel and the wheel housing to support the wheel during the kinetic launch of the satellite;
one or more springs, a first end of the one or more springs being attached to the wheel housing and a second end of the one or more springs being attached to the one or more support blocks, the one or more springs compressing when the one or more support blocks are placed between the wheel and the wheel housing; and
one or more release devices attached to the wheel housing, the one or more release devices being configured to secure the one or more support blocks between the wheel and the wheel housing during the kinetic launch of the satellite.

\* \* \* \* \*